(12) United States Patent
Cohen (10) Patent No.: US 9,657,909 B2
(45) Date of Patent: May 23, 2017

(54) SELF-CONTAINED, SOLAR-POWERED LED ILLUMINATOR MODULES AND APPLICATIONS THEREOF

(71) Applicant: RSR Sales, Inc., Ann Arbor, MI (US)

(72) Inventor: Richard Cohen, Ann Arbor, MI (US)

( * ) Notice: Subject to any disclaimer, the term of this patent is extended or adjusted under 35 U.S.C. 154(b) by 0 days.

(21) Appl. No.: 15/054,822

(22) Filed: Feb. 26, 2016

(65) Prior Publication Data

US 2016/0252224 A1     Sep. 1, 2016

Related U.S. Application Data

(63) Continuation-in-part of application No. 13/866,495, filed on Apr. 19, 2013, now abandoned, which is a
(Continued)

(51) Int. Cl.
| | |
|---|---|
| *F21S 9/03* | (2006.01) |
| *F21V 23/00* | (2015.01) |
| *F21V 23/04* | (2006.01) |
| *F21S 8/08* | (2006.01) |
| *F21V 3/04* | (2006.01) |
| *F21V 31/00* | (2006.01) |
| *F21V 3/02* | (2006.01) |
| *B44C 5/00* | (2006.01) |
| *F21V 9/16* | (2006.01) |
| *F21V 21/08* | (2006.01) |

(Continued)

(52) U.S. Cl.
CPC ................ *F21S 9/03* (2013.01); *B44C 5/005* (2013.01); *F21S 8/081* (2013.01); *F21S 9/032* (2013.01); *F21V 3/02* (2013.01); *F21V 3/0463* (2013.01); *F21V 9/16* (2013.01); *F21V 21/0824* (2013.01); *F21V 23/0464* (2013.01); *F21V 31/005* (2013.01); *H05B 37/0218* (2013.01); *F21S 8/08* (2013.01); *F21V 23/0442* (2013.01); *F21W 2121/00* (2013.01); *F21Y 2101/00* (2013.01); *F21Y 2101/02* (2013.01)

(58) Field of Classification Search
CPC .............................................. F21S 9/03–9/037
See application file for complete search history.

(56) References Cited

U.S. PATENT DOCUMENTS

| | | |
|---|---|---|
| 1,359,581 A | 11/1920 | Dodds |
| 2,459,693 A | 1/1949 | Gordon |

(Continued)

*Primary Examiner* — Mariceli Santiago
(74) *Attorney, Agent, or Firm* — John G. Posa; Belzer PC (57) ABSTRACT

A light source causes hollow objects to glow in the dark (GID), thereby extending the operating period of light-activated materials in gazing globes and other decorative or ornamental objects. The light source may be provided as part of a conversion kit, enabling objects from different manufacturers to be converted to GID objects following purchase. A base unit includes the light emitter supported to illuminate the object from the inside out. The base unit further includes at least one solar panel facing into the interior of the object, and one or more batteries charged by the solar panel to power the light emitter. A device is used to couple the base unit to the rim of the object. In the preferred embodiment, the device for coupling the base unit to the rim of the object is an elastomeric ring that stretches over the rim of the object, thereby forming a seal.

7 Claims, 8 Drawing Sheets

Related U.S. Application Data continuation of application No. 12/820,427, filed on Jun. 22, 2010, now abandoned, which is a continuation-in-part of application No. 11/472,716, filed on Jun. 22, 2006, now Pat. No. 7,784,956.

(60) Provisional application No. 60/693,361, filed on Jun. 23, 2005.

(51) Int. Cl.
*H05B 37/02* (2006.01)
*F21Y 101/02* (2006.01)
*F21W 121/00* (2006.01)
*F21Y 101/00* (2016.01)

(56) References Cited

U.S. PATENT DOCUMENTS

| | | | |
|---|---|---|---|
| 4,015,111 A | 3/1977 | Spector | |
| 4,400,162 A | 8/1983 | Rustemis | |
| 4,757,625 A | 7/1988 | Watkins | |
| 4,759,735 A | 7/1988 | Pagnol et al. | |
| 4,841,416 A | 6/1989 | Doss | |
| 4,970,793 A | 11/1990 | Atamian | |
| 5,782,552 A | 7/1998 | Green et al. | |
| 5,833,349 A | 11/1998 | Apple | |
| 6,039,453 A | 3/2000 | Wang | |
| 6,174,070 B1 | 1/2001 | Takamura et al. | |
| 6,479,936 B1 | 11/2002 | Martinez | |
| 6,517,217 B1 | 2/2003 | Liao | |
| 6,871,972 B2 | 3/2005 | Ju | |
| 7,029,144 B2 | 4/2006 | Fu | |
| 7,172,307 B2 | 2/2007 | Izardel | |
| 7,311,414 B2 | 12/2007 | Norton et al. | |
| 7,387,400 B2 | 6/2008 | Nakata et al. | |
| 7,784,956 B2 | 8/2010 | Cohen | |
| 2003/0079387 A1 | 5/2003 | Derose | |
| 2003/0133294 A1 | 7/2003 | Sittner | |
| 2003/0137831 A1 | 7/2003 | Lin | |
| 2004/0136177 A1 | 7/2004 | Lewis et al. | |
| 2004/0136179 A1 | 7/2004 | Lewis et al. | |
| 2005/0003120 A1 | 1/2005 | Kao | |
| 2005/0248934 A1 | 11/2005 | Weiser et al. | |
| 2005/0281031 A1 | 12/2005 | Fu | |
| 2006/0012978 A1 | 1/2006 | Allsop et al. | |
| 2006/0012996 A1 | 1/2006 | Tseng | |
| 2006/0114671 A1 | 6/2006 | Cranor et al. | |
| 2006/0227542 A1 | 10/2006 | Richmond | |
| 2010/0027248 A1* | 2/2010 | Tsung | A47J 37/0786 362/183 |
| 2011/0292644 A1 | 12/2011 | Cohen | |
| 2014/0133138 A1* | 5/2014 | Chang | F21S 9/037 362/158 |
| 2014/0218900 A1* | 8/2014 | Adair | F21S 9/037 362/183 |

* cited by examiner

SELF-CONTAINED, SOLAR-POWERED LED ILLUMINATOR MODULES AND APPLICATIONS THEREOF

REFERENCE TO RELATED APPLICATIONS

This application is a continuation-in-part of U.S. patent application Ser. No. 13/866,495, filed Apr. 19, 2013, which is a continuation of U.S. patent application Ser. No. 12/820,427, filed Jun. 22, 2010, which is a continuation-in-part of U.S. patent application Ser. No. 11/472,716, filed Jun. 22, 2006, now U.S. Pat. No. 7,784,956, which claims priority to U.S. Provisional Patent Application Ser. No. 60/693,361, filed Jun. 23, 2005, the entire content of each application being incorporated herein by reference.

FIELD OF THE INVENTION

This invention relates generally to decorative objects and, in particular, gazing globes and other ornamental objects including light sources and light-activated materials.

BACKGROUND OF THE INVENTION

U.S. Pat. No. 7,252,889 describes a method of fabricating glow-in-the-dark gazing globes or other objects, as well as the articles that result. The method comprises the steps of providing a hollow form having an inner wall made from a transparent or translucent material, the form including an aperture for gaining access to the interior thereof, and introducing one more photoluminescent pigments into the form through the aperture so that they cling to the inner wall. In alternative embodiments, the pigments may be applied without an adhesive, as by naturally cling, vacuum evaporation, or other techniques. If the object is a gazing globe, a supporting stand may be included. A plurality of different pigments may be introduced into the form to create a decorative or swirling effect. One drawback with the approach just described is that after a few hours following sundown, the light-emitting capabilities of these materials falls off, resulting in a product which no longer glows as nighttime continues.

Co-pending U.S. utility patent application Ser. No. 12/820,427, the entire content of which is incorporated herein by reference, improves upon the existing art by providing a light source to extend the operating period of light-activated materials in gazing globes and other decorative or ornamental objects. A solar cell is used to charge a battery during the day, allowing for a completely self-contained system. A photocell may be provided to turn the light source on and off, thereby limiting illumination to dark periods, conserving battery power. In one previously disclosed embodiment, the control electronics are contained in a base unit upon which the solar cell is mounted. The lower rim of the object to be illuminated press fits into the base unit using an elastomeric ring providing a leak-free fit. This also allows the object to be pulled out of the base unit for maintenance, if necessary. With such a configuration, the solar cell is disposed within the object to be illuminated, and the batteries are recharged as solar energy shines through the object during daylight hours.

SUMMARY OF THE INVENTION

This invention improves upon the existing art by providing a light source causing hollow objects to glow in the dark (GID), thereby extending the operating period of light-activated materials in gazing globes and other decorative or ornamental objects. The invention may be provided as a conversion kit, enabling objects from different manufacturers to be converted to GID objects following purchase.

Apparatus according to the invention for causing a hollow object to glow in the dark, the object having an interior with an opening having a rim, comprises a base unit including a light emitter supported to illuminate the object from the inside out. The base unit further includes at least one solar panel facing into the interior of the object, and one or more batteries charged by the solar panel to power the light emitter. A device is used to couple the base unit to the rim of the object.

In the preferred embodiment, the device for coupling the base unit to the rim of the object is an elastomeric ring that stretches over the rim of the object, thereby forming a seal. The solar panel may have a bottom edge coupling the solar panel to the base unit at an angle between 0 and 90 degrees. The solar panel may have a top edge to which the light emitter is attached. The light emitter may be a light-emitting diode (LED), including a violet or ultraviolet LED. The apparatus may further including a light detector operative to switch power to the light emitter when a sufficient level of darkness is detected.

DETAILED DESCRIPTION OF THE INVENTION

Figure 1:
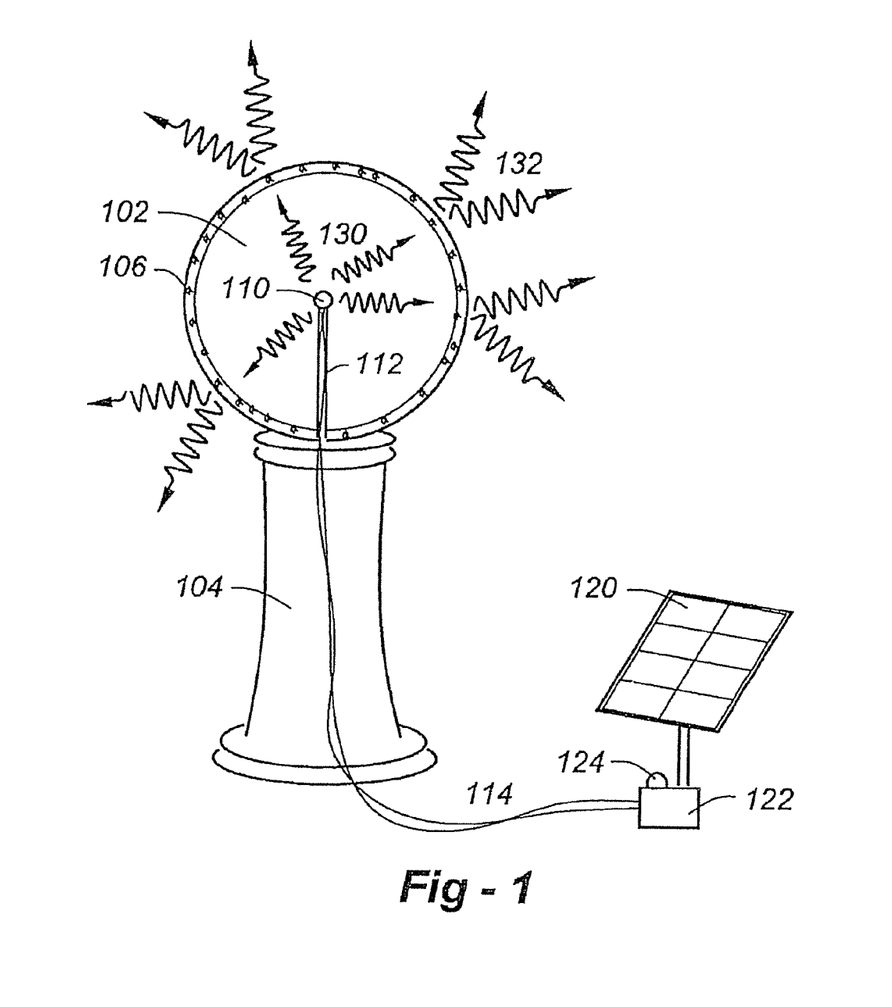
FIG. 1 is a drawing which shows the invention applied to a gazing globe.

FIG. 1 is a drawing which shows the invention applied to a gazing globe with the understanding that the principles and methods described herein are equally applicable to other indoor/outdoor decorative fixtures, which will be apparent to those of skill in the art.

The device includes a globe 102 which may be solid or hollow, including particles 106 which receive light 130 from one or more sources 110, and emit light 132 after the light source has been removed. Such glow-in-the-dark substances may be photoluminescent, phosphorescent, fluorescent, etc. These substances may either be embedded with the sphere 102, or applied to the interior or exterior surfaces thereof, by whatever appropriate means are available. In the event that the globe 102 or other ornamental object is glass, the particles 106 may be included into the melt prior to solidification, or adhered to the inside of the globe (or outside of the globe) through appropriate adhesives. Suitable plastics, including polycarbonates, may be used as an alternative to glass. The globe 102 or other object is preferably supported on a stand 104. The light-activated materials may be applied to create a 'swirling effect' when activated The light source 110 is used to provide wavelengths to activate the particles 106, typically after sunset. While the light source 110 may be used externally to the globe 102, in the preferred embodiment, it is held upright by a post 112 central to the inside of a hollow object, allowing for a relatively uniform illumination of the particles 106 while, at the same time, providing for a relatively discrete placement of the source 110. Although different wavelengths may be used, emitter 110 is preferably a violet or ultraviolet light-emitting diode (LED), which are now commercially available with quite high brightness levels. Utilizing common photo-active materials, light in this wavelength range causes the particles 106 to glow quite brightly, and assuming sufficient illumination during the day, this may achieve a glow-in-the-dark effect all night long in some cases. Although a single emitter 110 is shown, clearly multiple emitters may be used, including emitters closer to the particles 106

Figure 2:
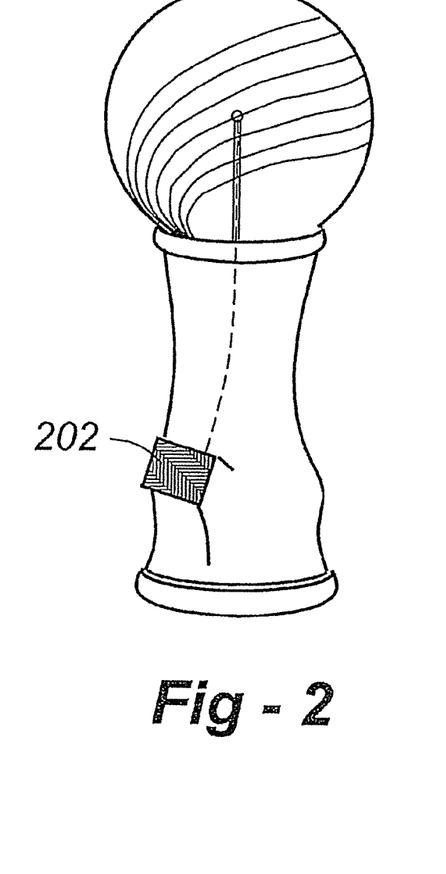
FIG. 2 is a drawing which shows how the solar panel and battery may be integrated into a stand.
Figure 3:
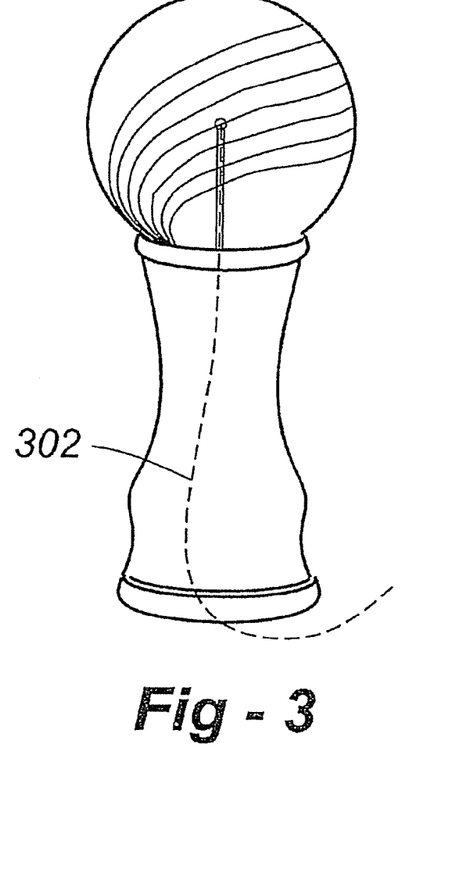
FIG. 3 is a drawing which shows how power may be supplied from a more distant source.

In the preferred embodiment, the source 110 is powered by an integrated module 202 built into the stand, as shown in FIG. 2. The module contains the solar panel, battery and necessary electronics. Preferably, a light sensor is used switching power from the batteries to the source 110 after a sufficient level of darkness has been achieved. This photocell may be located anywhere on the stand. In an alternative embodiment, a module 122 may provide power wires 114, allowing solar panel 120 to be located remotely from the ornamental object. In this case, a light sensor 124 may be mounted on the module. As a further alternative, power may be supplied from a more remote source through wires 302 shown in FIG. 3, allowing for ON/OFF operation from a house, for example, without the need for a solar panel.

Figure 4A:
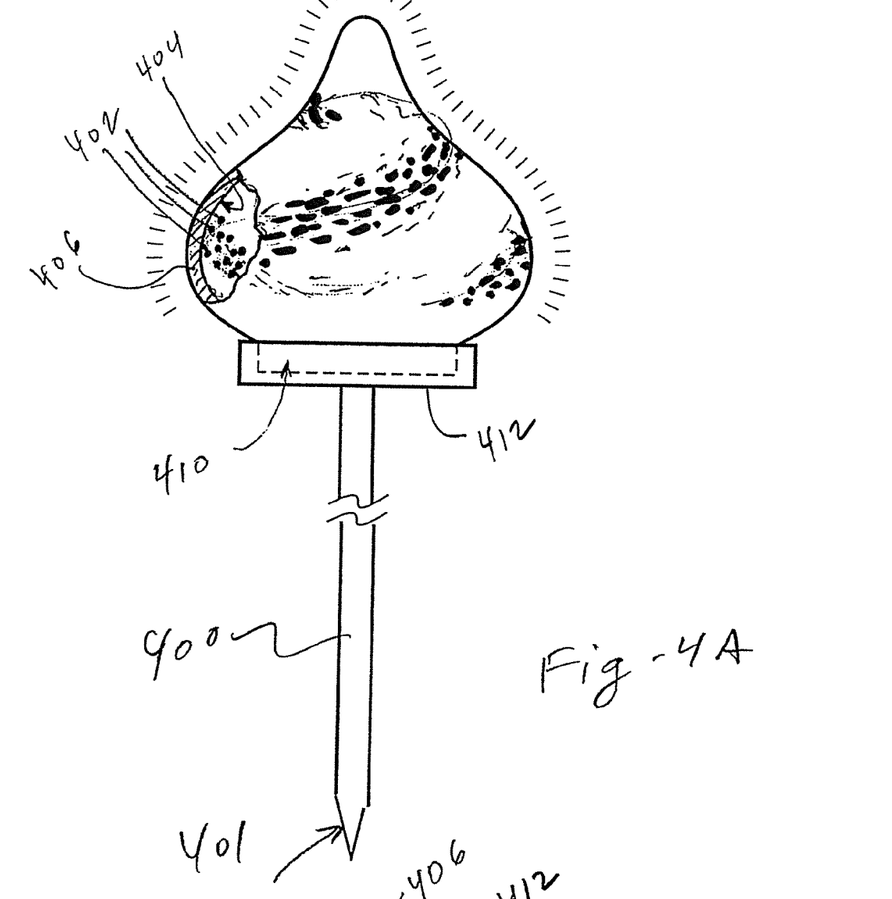
FIG. 4A is a side-view drawing that shows a self-contained embodiment of the invention comprising a teardrop-shaped, glow-in-the-dark (GID) object.
Figure 4B:
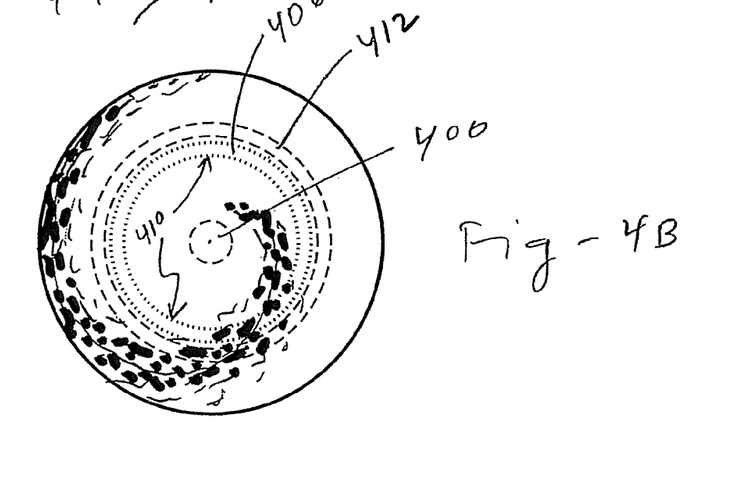
FIG. 4B is a top-view drawing that shows a self-contained embodiment of the invention comprising the teardrop-shaped object.

FIG. 4A is a side-view drawing that shows a self-contained embodiment of the invention comprising a teardrop-shaped, glow-in-the-dark (GID) object situated on an stake 400 with may include an earth-piercing point 401. FIG. 4B is a top-down view. "Self-contained" is this case means that the solar panel is located with its collection surface facing into the hollow interior of the object, as explained in further detail below.

In the embodiment of FIG. 4A, the GID particles 402 are adhered to the inner wall 404 of the hollow object 406 to create a pattern that spirals or swirls around the object from at least near the top to at least near the bottom. Differently shaped objects such a spheres 407 409 and 'flattened' spheres depicted with broken lines in FIG. 5. To create this GID pattern, glue is applied is the spiral pattern to the inner wall 404 with a long brush through the bottom opening of the form at 410 prior to installation on base 412. While the adhesive is still tacky, the object is filled with the GID particles and shaken in some cases so that they cling to the inner wall and become affixed thereto. The excess particles may be reclaimed for subsequent use.

Figure 5:
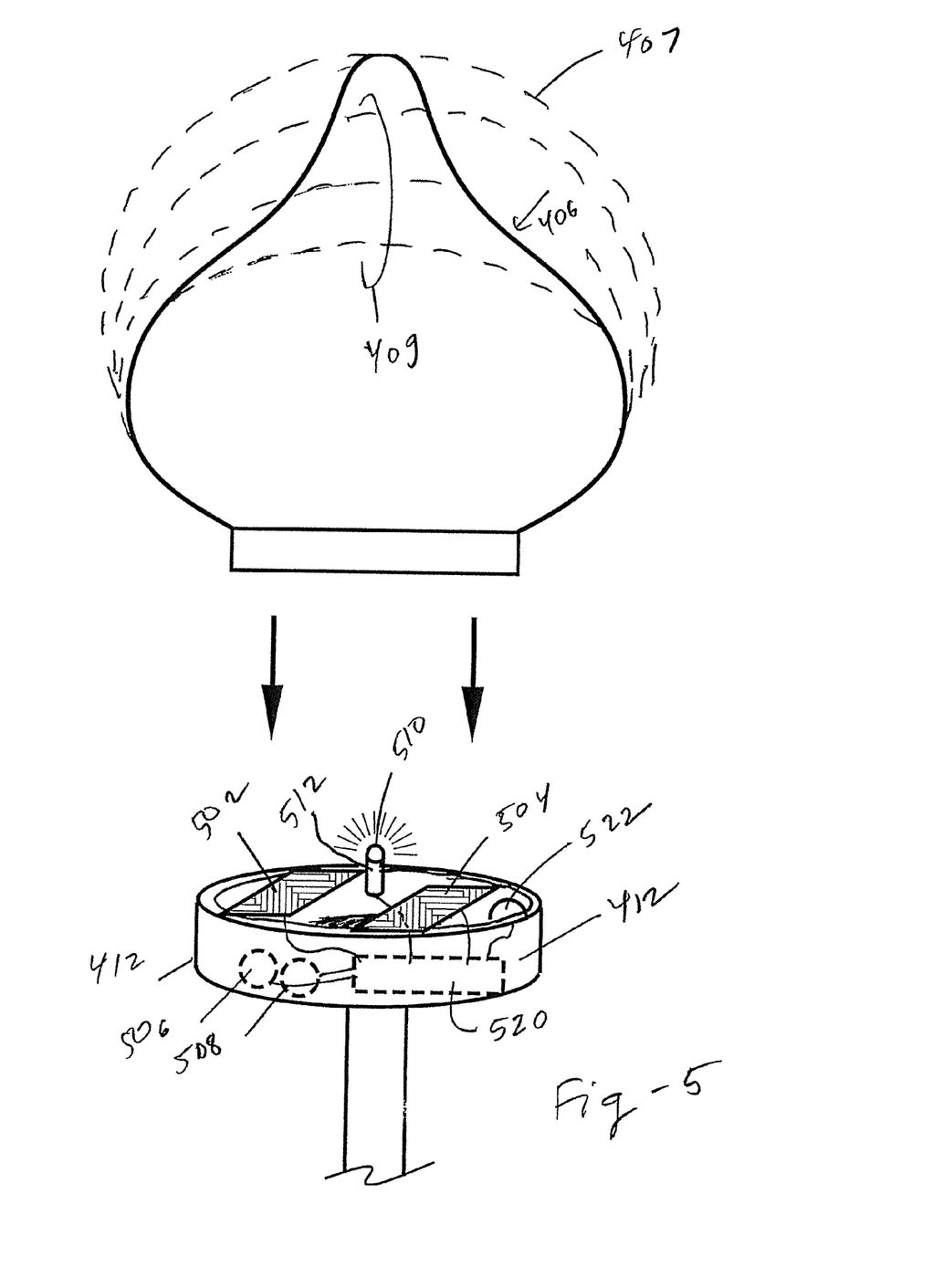
FIG. 5 is a partially exploded view of the article of FIGS. 4A, 4B.

FIG. 5 is a partially exploded view of the article of FIGS. 4A, 4B. As can be seen, base 412 includes one or more solar panels 502, 504 used to recharge one or more batteries 506, 508 to power LED 510. In the preferred embodiment, LED is a violet or ultraviolet LED to enhance the activation of the GID particles. The LED may be supported on a post 412 to bring the emitted closed to the center of the object. The various components are interconnected to control electronics 520, which may further be interconnected to optional photocell 522. A switch (not shown) may also be provided to turn the device ON and OFF.

Figure 6:
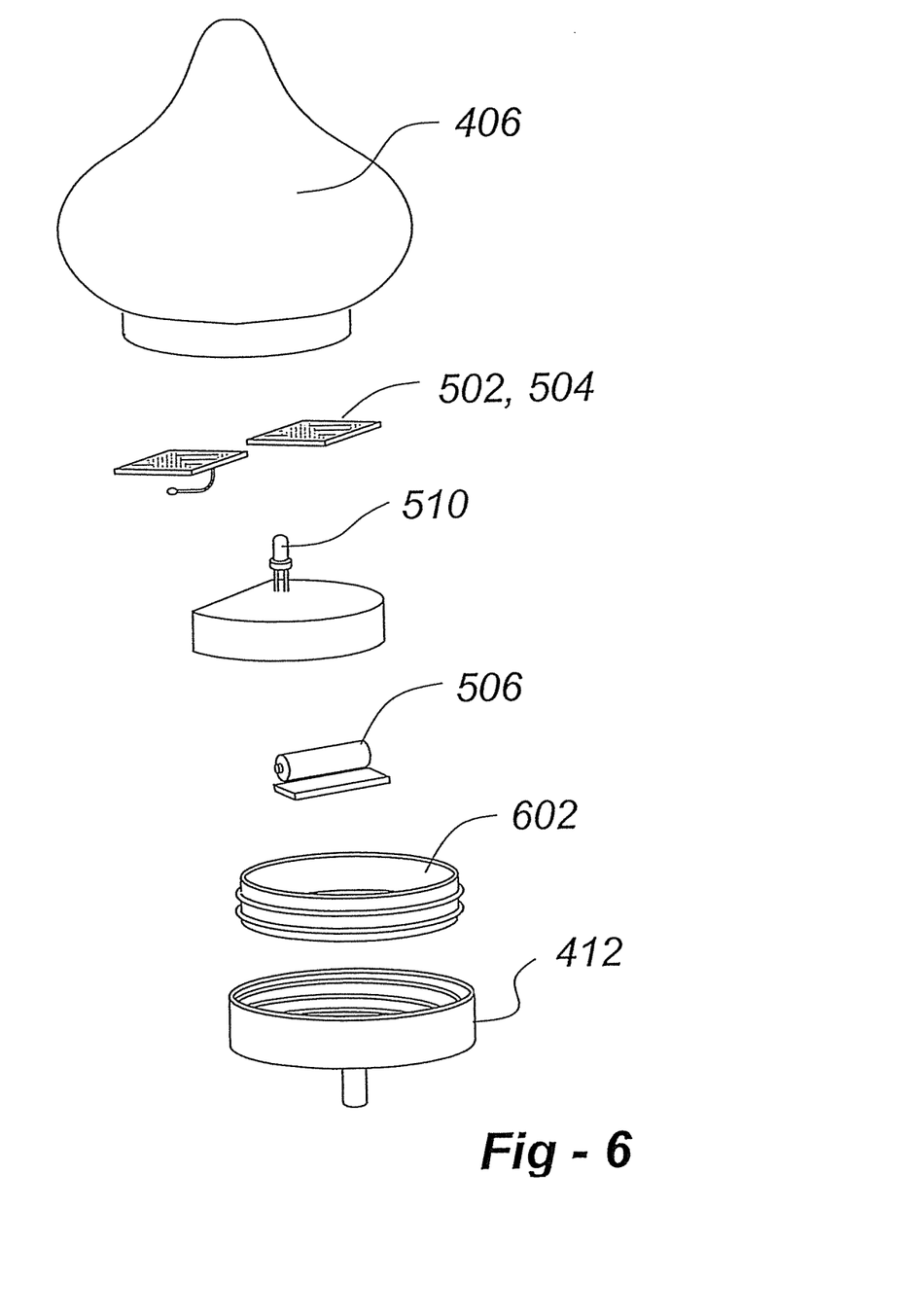
FIG. 6 is a fully exploded view.

FIG. 6 is a fully exploded view perhaps better illustrating the various component parts. While different assembly techniques may be used, the lower rim of the object 406 press fits into the base 412 using an elastomeric ring 602 providing a leak-free fit. This also allows the object 406 to be pulled out of the base maintenance, if necessary.

Figure 7:
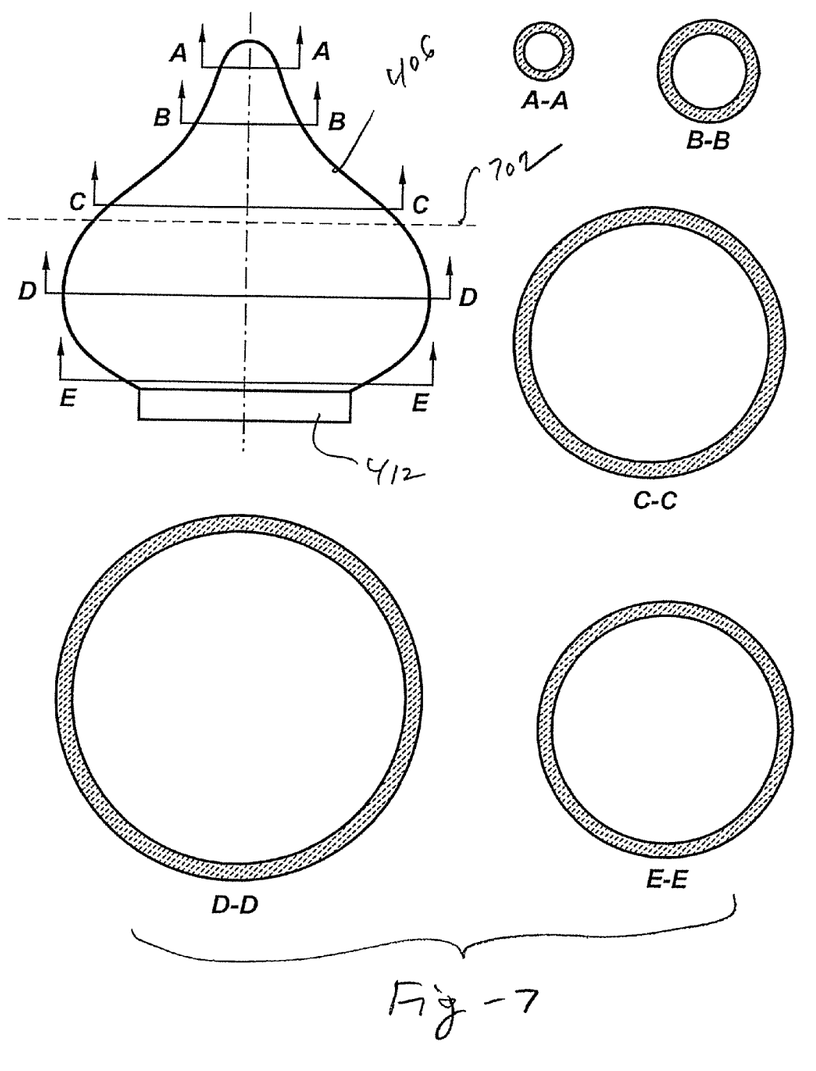
FIG. 7 is a series of cross sections of the teardrop shaped GID object.

FIG. 7 is a series of cross sections of a teardrop-shaped GID object 406 made in accordance with the invention. Cross sections A-A through E-E, all generally circular, are taken at different horizontal slices through object 405. The horizontal centerline is generally shown at 702. Above this line, cross sections gradually progress from C-C to B-B to A-A in monotonically decreasing sizes. Below the line 702, however, the diameter first assumes a maximum diameter at D-D before reducing at E-E before transitioning into base, thereby resulting in a teardrop or "Hershey's kiss" type configuration.

Figures 8A, 8B:
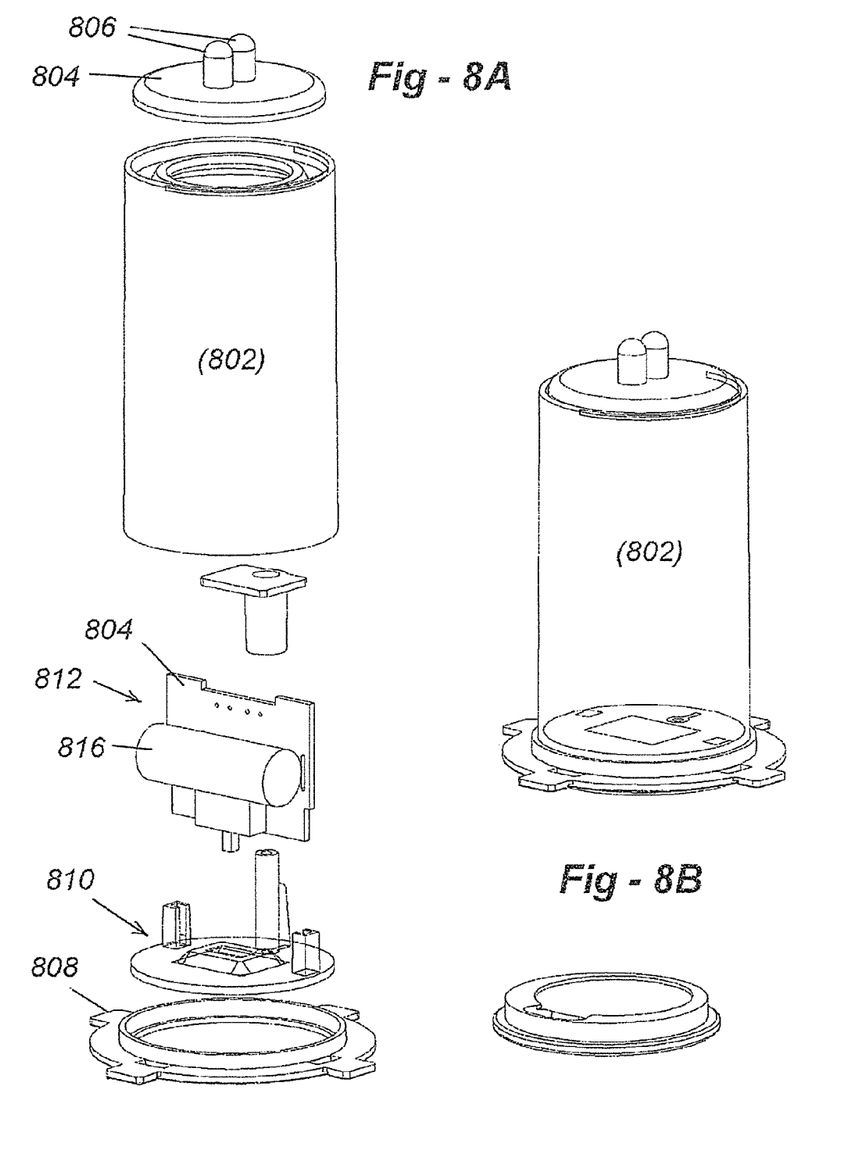
FIG. 8A is an exploded view of an embodiment of the invention using two or more LEDs.
FIG. 8B is a partially assembled view of the embodiment of FIG. 8A.

FIG. 8A is an exploded view of an embodiment of the invention using two or more LEDs. FIG. 8B is a partially assembled view. This embodiment includes a housing preferably in the form of a hollow cylindrical plastic tube 802 having an upper end and a lower end. A solar module 804 attaches to the upper end of the housing, and one or more LEDs 806 are mounted on the module 804. The lower end of the housing is coupling to a plastic mounting ring 808. The assembly further includes a base component 810 configured to receive electronics module 812. The electronics module 812 includes a printed-circuit board (PCB) 814 to which there is mounted a rechargeable battery 816 and other components responsible for light the LEDs 806 which are mounted to PCB 814 via holes 818.

Figure 8C:
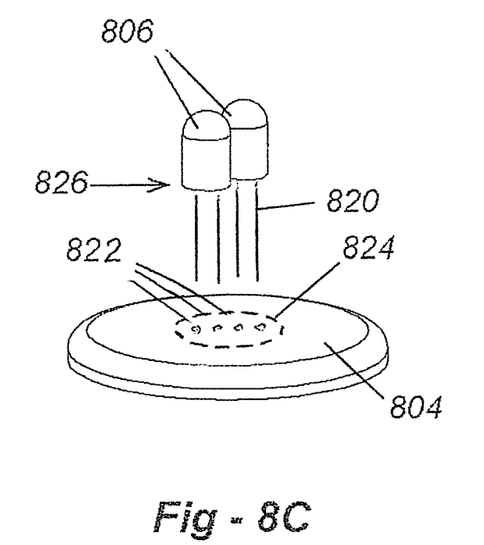
FIG. 8C is a detail view showing how the LEDs mount relative to the solar module.

FIG. 8C is a detail view showing how the LEDs 806 mount relative to the solar module 804. While the leads 820 of the LEDs may be bent and dressed along the surface of the module 804, in the preferred embodiment, small holes 822 are formed entirely through the module 804 in a central region 824 of the module 804. This allows the bottom portions of the LEDs to be positioned directly against the upper surface of the module 804 with the LEDs extending straight up from the upper outer surface of the module 804. A sealant may be used between the bottom surface of each LED and the upper outer surface of the module 804 to further protect against humidity. The solar module 804 includes one or more solar panels embedded and sealed within the module 804 using a clear coating to ensure light transmissivity. Holes 822 may either be formed between separate embedded solar panels within the module 804, or the holes may be formed through a single solar cell, preferably in regions of the cell that avoid interconnection patterns.

The resulting assembly provides a sealed, entirely self-contained LED module that than be used in a variety of different applications. The LEDs may be different colors, and the electronics module 812 may be designed or programmed to control the operation of the lights in any desired pattern or sequence including flashing, gradual turn ON/OFF, etc. In other embodiments, the LEDs may be the same color, with multiple emitters being used simply to increase brightness. While one or two LEDs may be useful for most applications, a group of three may be used in a triangular formation, for example, with additional holes formed through the solar module 804. Four or more LEDs may also be used. As with the other embodiments disclosed herein, either the solar module 804 or a separate photocell (not shown) may be used to automatically turn the LEDs ON at dusk.

I claim:

1. A self-contained, solar-powered illuminator module, comprising:
    a housing having an upper end and a lower end;
    a solar collection module coupled to the upper end of the housing, the solar collection module having an upper surface and one or more solar panels embedded therein;
    one or more light-emitting diodes (LEDs) extending upwardly from the upper surface of the solar collection module, each LED having a bottom surface;
    a plurality of holes formed entirely through the solar collection module enabling the bottom surface of each LED to be positioned directly against the upper surface of the solar collection module;
    at least one rechargeable battery disposed within the housing; and
    control electronics disposed within the housing, the control electronics being operatively connected to the solar panel, LEDs and the rechargeable battery to recharge the battery using sunlight and activate the LEDs when ambient light falls below a predetermined level.

2. The self-contained, solar-powered illuminator module of claim 1, including:
    a solar panel embedded within the solar collection module; and
    wherein the holes for the LEDs penetrate through the solar panel.

3. The self-contained, solar-powered illuminator module of claim 1, including:
    a solar panel embedded within the solar collection module;
    at least two LEDs; and
    wherein the holes for the LEDs penetrate through the solar panel.

4. The self-contained, solar-powered illuminator module of claim 1, further including a light detector operative to switch power to the LEDs when a sufficient level of darkness is detected.

5. The self-contained, solar-powered illuminator module of claim 1, further including a mechanism for coupling the housing to a decorative article to provide illumination for the decorative article.

6. The self-contained, solar-powered illuminator module of claim 1, wherein the housing is a hollow cylindrical tube.

7. The self-contained, solar-powered illuminator module of claim 1, further including a base component that closes off the lower end of the housing.

* * * * *